United States Patent
Mesona et al.

(10) Patent No.: US 12,384,693 B2
(45) Date of Patent: Aug. 12, 2025

(54) INSTALLATION AND METHOD FOR CONVERTING URANIUM HEXAFLUORIDE TO URANIUM DIOXIDE

(71) Applicant: FRAMATOME, Courbevoie (FR)

(72) Inventors: Bruno Mesona, Saint Marcel les Valence (FR); Stéphane Hebrard, Ventabren (FR)

(73) Assignee: FRAMATOME, Courbevoie (FR)

(*) Notice: Subject to any disclaimer, the term of this patent is extended or adjusted under 35 U.S.C. 154(b) by 945 days.

(21) Appl. No.: 17/282,951

(22) PCT Filed: Oct. 9, 2018

(86) PCT No.: PCT/FR2018/052504
§ 371 (c)(1),
(2) Date: Apr. 5, 2021

(87) PCT Pub. No.: WO2020/074794
PCT Pub. Date: Apr. 16, 2020

(65) Prior Publication Data
US 2021/0387863 A1    Dec. 16, 2021

(51) Int. Cl.
| | |
|---|---|
| *C01G 43/025* | (2006.01) |
| *B01J 6/00* | (2006.01) |
| *B01J 19/14* | (2006.01) |
| *B01J 19/26* | (2006.01) |
| *G21C 3/62* | (2006.01) |
| *G21C 19/46* | (2006.01) |

(52) U.S. Cl.
CPC ........... *C01G 43/025* (2013.01); *B01J 6/008* (2013.01); *B01J 19/14* (2013.01); *B01J 19/26* (2013.01); *G21C 3/623* (2013.01); *G21C 19/46* (2013.01); *B01J 2219/00245* (2013.01)

(58) Field of Classification Search
CPC ......... C01G 43/025; B01J 6/008; B01J 19/14; B01J 19/26; G21C 3/623; G21C 19/46
See application file for complete search history.

(56) References Cited

U.S. PATENT DOCUMENTS

| | | | |
|---|---|---|---|
| 3,786,120 A | 1/1974 | De Hollander et al. | |
| 4,090,976 A * | 5/1978 | DeHollander | C01G 43/01 423/261 |
| 5,723,100 A | 3/1998 | Carter | |
| 6,136,285 A * | 10/2000 | Feugier | G21C 19/48 422/142 |
| 6,348,282 B1 | 2/2002 | Okochi et al. | |
| 7,422,626 B2 * | 9/2008 | Feugier | B01D 46/715 422/187 |
| 7,824,640 B1 | 11/2010 | Lahoda | |
| 2021/0347653 A1 * | 11/2021 | Mesona | F27B 7/00 |

FOREIGN PATENT DOCUMENTS

| | | |
|---|---|---|
| CN | 1244178 A | 2/2000 |
| CN | 101293672 A | 10/2008 |
| CN | 101955229 A | 1/2011 |
| CN | 105253917 A | 1/2016 |
| EP | 1985587 A1 | 10/2008 |
| EP | 2277831 A1 | 1/2011 |
| JP | H0680424 A | 3/1994 |
| JP | H09504113 A | 4/1997 |

OTHER PUBLICATIONS

Corresponding Search Report for PCT/FR2018/052504.

* cited by examiner

*Primary Examiner* — Yong L Chu
(74) *Attorney, Agent, or Firm* — Davidson Kappel LLC

(57) ABSTRACT

An installation for the conversion of uranium hexafluoride ($UF_6$) to uranium dioxide ($UO_2$) comprises a hydrolysis reactor (4) for the conversion of $UF_6$ into uranium oxyfluoride powder ($UO_2F_2$), a pyrohydrolysis furnace (6) for converting the $UO_2F_2$ powder supplied by the reactor (4) into $UO_2$ powder, a supply device (8) comprising reagent injection ducts (10) for the injection of $UF_6$, water vapor or $H_2$, and a control system (16) designed to control the supply device (8) so as to supply at least one of the reagent injection ducts (10) with a neutral gas during a shutdown or start-up phase of the conversion installation.

13 Claims, 1 Drawing Sheet

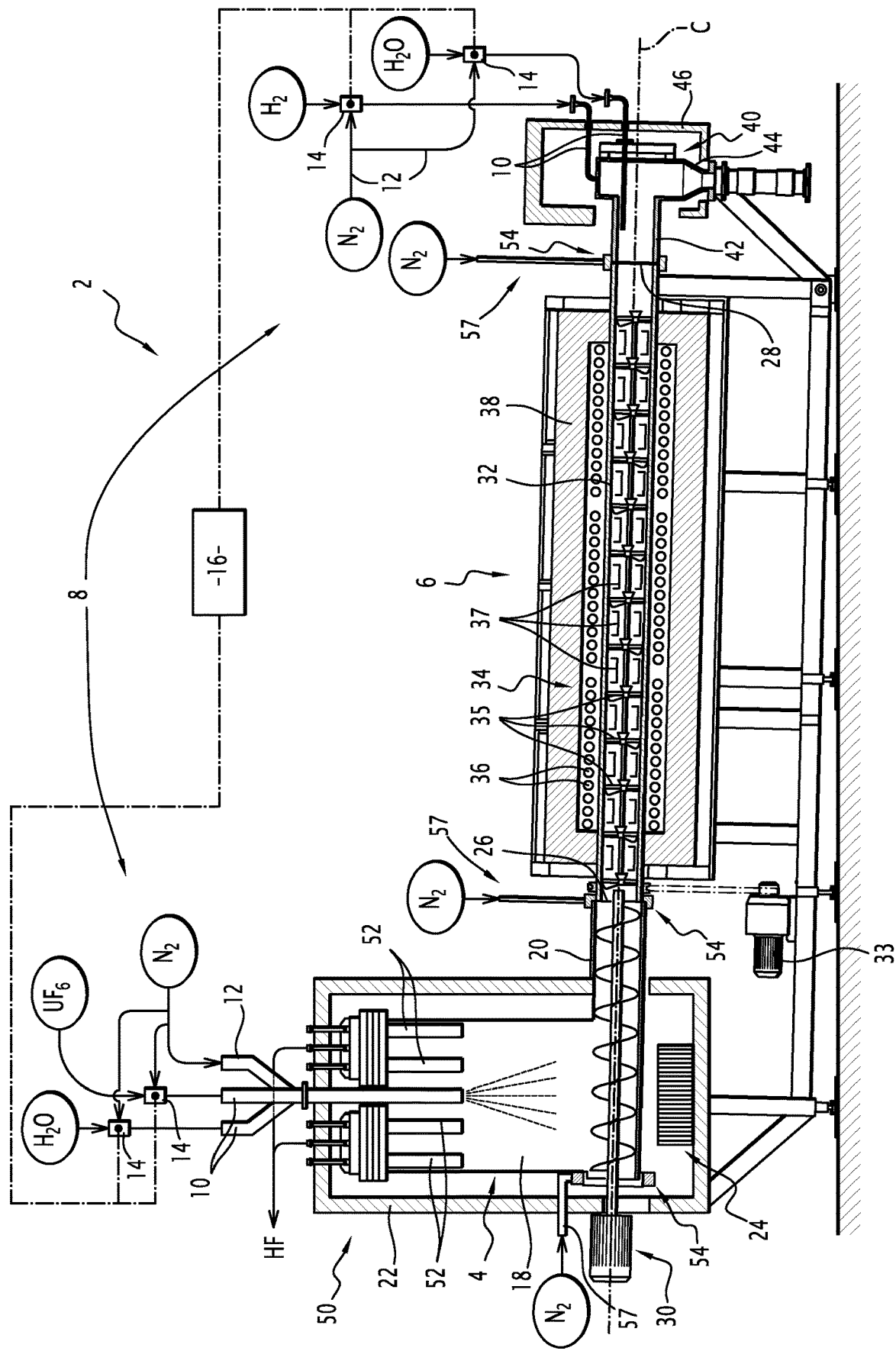

INSTALLATION AND METHOD FOR CONVERTING URANIUM HEXAFLUORIDE TO URANIUM DIOXIDE

The present disclosure relates to the field of the production of uranium dioxide ($UO_2$) powder, intended in particular for the manufacture of $UO_2$ pellets for nuclear fuel rods.

BACKGROUND

It is possible to enrich uranium in the form of uranium hexafluoride ($UF_6$). However, it is then necessary to convert $UF_6$ to $UO_2$ to make $UO_2$ pellets.

To do this, it is possible to convert gaseous $UF_6$ into uranium oxyfluoride ($UO_2F_2$) by hydrolysis in a reactor, by injecting $UF_6$ gas and dry water vapor into the reactor to obtain $UO_2F_2$ powder, then converting the $UO_2F_2$ powder into $UO_2$ powder by pyrohydrolysis in an furnace, circulating the $UO_2F_2$ powder in the furnace and injecting dry water vapor and hydrogen ($H_2$) gas in the furnace.

The hydrolysis reaction is carried out under an atmosphere of neutral gas (or inert gas), preferably under a nitrogen atmosphere. To do this, neutral gas is injected into the reactor, forming a gas flow sweeping the reactor.

U.S. Pat. Nos. 6,136,285 and 7,824,640 disclose an installation for converting $UF_6$ into $UO_2$ comprising a hydrolysis reactor and a pyrohydrolysis furnace for carrying out such a conversion method.

When manufacturing $UO_2$, it is desirable to avoid any accumulation of uranium (U) within the conversion installation for safety and security (criticality) reasons. In addition, one of the co-products resulting from the successive $UF_6 \rightarrow UO_2F_2 \rightarrow UO_2$ conversions is hydrogen fluoride (HF) gas, which is very toxic and corrosive. It is therefore important to ensure the continuous evacuation and storage of the HF outside the conversion installation.

During untimely or scheduled shutdowns of the conversion installation, there is a risk of accumulating reaction products or reagents in the installation. It is then necessary to maintain the installation in a configuration of maximum safety and security while taking care not to reach the critical U-shaped mass inside the installation, avoiding any reaction on the one hand between the hydrogen and oxygen (risk of explosion) and on the other hand between HF and $H_2O$ (formation of hydrofluoric acid) and not causing the installation to clog due to the agglomeration of the powder.

In addition, the $UF_6$ which is injected into the installation in gaseous form crystallizes below its sublimation temperature (56.4° C. at 1 atm). The crystallization of $UF_6$ results in a hard blocking of the moving parts of the installation and the blocking of the device for injecting reactive gases into the reactor.

Furthermore, the presence of reactive or reaction products in the installation may present a risk to the safety of the operators who must intervene in the event of shutdown of the installation. The main risks when opening the installation are linked to the absence of air in the installation (operator anoxia), the toxicity of HF and the risk of internal and external contamination by uranium.

SUMMARY

One of the aims of the present disclosure is to provide an installation for converting $UF_6$ to $UO_2$, the safety and security of which are improved during the shutdown phases of the installation.

To this end, the present disclosure provides an installation for converting uranium hexafluoride ($UF_6$) into uranium dioxide ($UO_2$), the conversion installation comprising:
- a hydrolysis reactor (4) for the conversion of $UF_6$ into uranium oxyfluoride powder ($UO_2F_2$) by reaction between gaseous $UF_6$ and dry water vapor injected into the reactor (4);
- a pyrohydrolysis furnace for the conversion of the $UO_2F_2$ powder supplied by the reactor into $UO_2$ powder by reacting the $UO_2F_2$ powder with dry water vapor and gaseous hydrogen ($H_2$) injected into the furnace;
- a supply device comprising reagent injection ducts for the injection of $UF_6$, water vapor or $H_2$, each reagent injection duct being designed to supply the reactor or the furnace and
- a control system designed to control the supply device so as to supply at least one of the reagent injection ducts with a neutral gas during a shutdown or start-up phase of the conversion installation.

According to particular embodiments, the conversion installation comprises one or more of the following optional characteristics, taken individually or in any technically feasible combination:
- the control system is designed to control the supply device so as to supply each reagent injection duct with a neutral gas during shut down or start up of the conversion installation;
- the supply device comprises, in addition to the reagent injection ducts, at least one neutral gas injection duct for injecting neutral gas into the reactor during a production phase for the conversion of $UF_6$ into $UO_2$ in a neutral gas atmosphere;
- the supply device comprises a neutral gas injection duct for supplying the reactor with neutral gas by forming a jet of neutral gas separating a jet of $UF_6$ and a jet of water vapor coming from reagent injection ducts opening into the reactor;
- the control system is designed to supply each of the reagent injection ducts with a neutral gas, by supplying the reagent injection ducts sequentially from upstream to downstream or from downstream to upstream of the conversion installation taking into account the direction of uranium movement in the conversion installation;
- in the shutdown phase of the conversion installation, the control system is designed to successively stop the supply of $UF_6$ to the reactor and replace it with a supply of neutral gas, then stop the supply of reactor water vapor and replace it with a neutral gas supply, then optionally, after all the $UO_2F_2$ powder has been removed from the reactor, stop a transfer device designed to transfer the $UO_2F_2$ powder from the reactor to the furnace, then stop the supply of $H_2$ to the furnace and replace it with a supply of neutral gas, then stop the supply of dry water vapor to the furnace and replace it with a supply of neutral gas, then, optionally, after evacuation of all the powder of $UO_2$ from the furnace and cooling of a drum of the furnace, stop the rotation of the drum;
- during the start-up phase of the conversion installation, the control system is designed to successively inject neutral gas into the reactor and the furnace via the reagent injection ducts and the neutral gas injection ducts for a period of a heating step of the conversion installation; then replace the neutral gas supply via the reactant injection ducts of the furnace and the reactor with a reactive gas supply, by sequentially supplying the reactant injection ducts with reactive gases from downstream to upstream of the conversion installation by taking into account the direction of uranium movement in the conversion installation.

The present disclosure also provides a method for converting uranium hexafluoride ($UF_6$) into uranium dioxide ($UO_2$) in a conversion installation comprising a hydrolysis reactor for the conversion of $UF_6$ into uranium oxyfluoride powder ($UO_2F_2$) by reaction between gaseous $UF_6$ and dry water vapor injected into the reactor and a pyrohydrolysis furnace for the conversion of the $UO_2F_2$ powder supplied by the reactor into $UO_2$ powder by reaction between $UO_2F_2$ and dry water vapor and hydrogen gas ($H_2$) injected into the furnace, the method comprising the steps of:

converting $UF_6$ into $UO_2$ by supplying the reactor and the furnace with reactive gases via reagent injection ducts during a conversion phase, each reagent injection duct opening into the reactor or into the furnace; and supplying at least one reagent injection duct with a neutral gas during a shutdown or start-up phase of the conversion installation.

According to particular modes of implementation, the conversion method comprises one or more of the following optional characteristics, taken in isolation or in any technically feasible combination:

during the shutdown or start-up phase of the conversion installation, each reagent injection duct is supplied with neutral gas;

during a production phase, neutral gas is injected into the reactor via at least one neutral gas injection duct to carry out the conversion under a neutral gas atmosphere;

the shutdown of the conversion installation comprises a purging step during which the reagent injection ducts are supplied with neutral gas sequentially from upstream to downstream of the conversion installation, taking into account the direction of uranium movement;

it comprises, in a phase of shutting down the conversion installation, the successive steps of stopping the supply of $UF_6$ to the reactor and replacing it with a supply of neutral gas, then stopping the supply of dry water vapor to the reactor from the reactor and replacing it with a supply of neutral gas, then, optionally, after removing all the $UO_2F_2$ powder from the reactor, stopping a transfer device designed to transfer the $UO_2F_2$ powder from the reactor to the furnace, then stopping the supply of $H_2$ to the furnace and replacing it with a supply of neutral gas, then stopping the supply of dry water vapor to the furnace and replacing it with a supply of neutral gas, then, optionally, after evacuation of any $UO_2$ powder from the furnace and cooling a furnace drum, stopping the drum rotation;

it comprises, in a start-up phase of the conversion installation, the successive steps of injecting neutral gas into the reactor and the furnace via the reagent injection ducts and the neutral gas injection ducts during a heating step of the conversion installation; then replacing the neutral gas supply via the reactant injection ducts of the furnace and the reactor with a reactive gas supply, by supplying the reactant injection ducts with reactive gases sequentially from downstream to upstream of the conversion installation, taking into account the direction of uranium movement.

BRIEF SUMMARY OF THE DRAWINGS

The present disclosure and its advantages will be better understood upon reading the description which follows, given solely by way of example and made with reference to the single FIGURE which is a schematic view of an installation for converting $UF_6$ into $UO_2$.

DETAILED DESCRIPTION

The conversion installation 2 illustrated in FIG. 1 comprises a hydrolysis reactor 4 for the conversion of $UF_6$ to $UO_2F_2$ powder by reaction between gaseous $UF_6$ and dry water vapor injected into the reactor 4.

The conversion installation 2 comprises a pyrohydrolysis furnace 6 for converting the $UO_2F_2$ powder supplied by the reactor 4 into $UO_2$ powder by reacting the $UO_2F_2$ powder with dry water vapor and $H_2$ gas injected into the furnace 6.

The conversion installation 2 comprises a supply device 8 designed to inject the reactive gases ($UF_6$ gas, dry water vapor and $H_2$ gas) into the reactor 4 and into the furnace 6.

The supply device 8 is supplied from sources of reactive gases, comprising at least one source of gaseous $UF_6$, at least one source of dry water vapor and at least one source of gaseous $H_2$.

The supply device 8 comprises reagent injection ducts 10 for injecting the reactive gases into the reactor 4 and into the furnace 6.

The reagent injection ducts 10 comprise a $UF_6$ injection duct feeding the reactor 4, a first vapor injection duct feeding the reactor 4, a second vapor injection duct feeding the furnace 6 and an injection duct $H_2$ feeding the furnace 6.

The supply device 8 is further designed for the injection of a neutral gas into the reactor 4, in particular in the production phase of the conversion installation 2, so that the conversion of $UF_6$ into $UO_2F_2$ takes place under a neutral gas atmosphere. The supply device 8 comprises one or more neutral gas injection ducts 12 for the injection of neutral gas into the reactor 4.

Preferably, the supply device 8 is further designed for the injection of neutral gas into the reactor 4 and into the furnace 6 in the shutdown and start-up phases, so as to maintain an atmosphere of neutral gas in reactor 4 and in furnace 6 when the conversion installation 2 is not in the production phase. The supply device 8 comprises one or more neutral gas injection ducts 12 for the injection of neutral gas into the furnace 6.

The supply device 8 is designed to allow the injection of neutral gas into the reactor 4 without injecting the neutral gas into the furnace 6.

In the production phase, the supply device 8 injects neutral gas into the reactor 4 in order to convert $UF_6$ into $UO_2F_2$ powder under an atmosphere of neutral gas, without injecting neutral gas into the furnace 6. The injected neutral gas in the reactor 4 in the production phase is called "neutral scavenging gas" hereafter. In the shutdown and/or start-up phase, the supply device 8 injects neutral gas into the reactor 4 and into the furnace 6 so as to maintain an atmosphere of neutral gas.

The supply device 8 is supplied by at least one source of neutral gas. The neutral gas is preferably nitrogen ($N_2$).

The supply of the furnace 6 with neutral gas during a shutdown or start-up phase may be carried out for example by means of a dedicated neutral gas injection duct 12 opening into the furnace 6 or via a reagent injection duct 10 as explained below.

The supply device 8 is designed to allow the supply of at least one reagent injection duct 10 with neutral gas, and preferably for the supply of each reagent injection duct 10 with an inert gas.

As illustrated in FIG. 1, the supply device 8 comprises a supply control actuator 14 disposed at the inlet of each reagent injection duct 10, the actuator 14 making it possible to selectively connect the reactant injection duct 10 to the corresponding reactant gas source or to a neutral gas source.

Each actuator 14 controls the supply of fluid to the associated reagent injection duct 10. Each actuator 14 is for example a valve, in particular a three-way valve making it possible to selectively connect the reagent injection duct 10 to the associated reagent source or to a source of neutral gas.

As illustrated in FIG. 1, the supply device 8 comprises, for the injection of reactive gases into the reactor 4, two reagent injection ducts 10, namely the $UF_6$ injection duct and the first vapor injection duct, and a neutral gas injection duct 12 opening into the reactor 4 so as to inject a jet of neutral gas between a jet of $UF_6$ and a jet of dry water vapor.

In this configuration, the reaction between $UF_6$ and dry water vapor occurs at a distance from the outlets of the reagent injection ducts 10, once the streams are mixed, and not near the outlets of the reagent injection ducts 10, which could lead to the formation of powder in the reagent injection ducts 10 and their clogging. In an advantageous embodiment, the jet of $UF_6$, the jet of neutral gas and the jet of dry water vapor are concentric.

The conversion installation 2 comprises a control system 16 of the conversion installation 2, designed to control the conversion installation 2 and in particular the supply device 8. The control system 16 in particular controls the actuators 14 of the supply device 8.

The control system 16 controls the supply device 8 according to different operating modes of the conversion installation 2.

In a production mode of the conversion installation 2, the control system 16 is designed to control the supply device 8 for the injection of the reactive gases into the reactor 4 and into the furnace 6 via the reagent injection ducts 10.

In a shutdown mode of the conversion installation 2, the control system 16 is designed to control the supply device 8 for supplying at least one of the reagent injection ducts 10 with neutral gas, and preferably the supply of each reagent injection duct 10 with neutral gas.

The supply of the reagent injection ducts 10 with neutral gas when the conversion installation 2 is shut down makes it possible to cause the conversion installation 2 and to purge the reagent injection ducts 10 of any reagent gas still present in these reagent injection ducts 10.

This makes it possible to prevent a reaction from occurring between residual reactive gases during a shutdown phase of the conversion installation 2, which could lead to the uncontrolled generation of $UO_2F_2$ powder, $UO_2$ powder or HF, potentially dangerous for operators called upon to work on the conversion installation 2 during the shutdown phase of the conversion installation 2.

The supply of a reagent injection duct 10 with neutral gas during a start-up allows the temperature rise of the conversion installation 2 and the supply of the conversion installation 2 with reagents when the parameters of reaction are achieved in reactor 4, respectively furnace 6.

During the production phase, the control system 16 controls the supply device 8 for the injection of neutral gas into the reactor 4 via the appropriate neutral gas injection ducts 12, in addition to the injection of the reactive gases via the reagent injection ducts 10, so that the hydrolysis is carried out under an atmosphere of neutral gas. Neutral gas is not injected into furnace 6.

During the shutdown phase, preferably, the control system 16 controls the supply device 8 for the injection of neutral gas into the reactor 4 and into the furnace 6 so as to maintain the atmosphere of neutral gas in reactor 4 and in furnace 6.

The injection of neutral gas during the shutdown phase is carried out via the reagent injection ducts 10, and possibly also via the neutral gas injection ducts 12 supplying the reactor 4 and/or the furnace 6.

The supply of the reagent injection ducts 10 with neutral gas during the shutdown of the conversion installation 2 then allows an additional injection of neutral gas, in addition to that carried out by the neutral gas injection ducts 12.

As illustrated in FIG. 1, the reactor 4 delimits a reaction chamber 18 into which the reagent injection ducts 10 open, supplying the reactor 4 with gaseous $UF_6$ and with dry water vapor, and in which the reaction takes place conversion of $UF_6$ to $UO_2F_2$ by hydrolysis. The $UO_2F_2$ thus obtained is in the form of a powder falling to the bottom of the reaction chamber 18.

The reactor 4 has an outlet tubing 20 extending from reaction chamber 18 and connected to furnace 6 to transfer $UO_2F_2$ powder from the bottom of reaction chamber 18 to furnace 6.

The conversion installation 2 comprises a thermal chamber 22 surrounding the reactor 4 and a heater 24 for heating the internal volume of the thermal chamber 22 and therefore the reactor 4.

The furnace 6 has an inlet 26 connected to the outlet duct 20 of the reactor 4 to receive the $UO_2F_2$ powder and an outlet 28 to supply the $UO_2$ powder.

The conversion installation 2 comprises a transfer device 30 for transferring the $UO_2F_2$ powder from the reaction chamber 18 to the furnace 6. The transfer device 30 here comprises a motorized endless screw driven by a motor to push the $UO_2F_2$ powder from the reaction chamber 18 to inlet 26 of furnace 6.

The furnace 6 comprises a drum 32 having a central axis C, an axial end of which forms the inlet 26 while the opposite axial end forms the outlet 28 of the furnace 6.

The drum 32 is provided for the circulation of the $UO_2F_2$ powder from the inlet 26 to the outlet 28 with circulation of dry water vapor and $H_2$ in the furnace 6 against the current of the $UO_2F_2$ powder.

The drum 32 is rotatably mounted around its central axis C inclined relative to the horizontal so that the inlet 26 is higher than the outlet 28, the rotation of the drum 32 causing the powder to advance from the inlet. 26 towards outlet 28.

The furnace 6 comprises a motorized rotational drive device 33 designed for driving the drum 32 in rotation about its central axis C. The rotational drive device 33 comprises for example a motor and a transmission device, for example a chain or belt, coupling the motor to the drum 32.

As an option, the furnace 6 is advantageously provided with a crank handle which allows the drum 32 to be turned manually in the event of failure of the rotary drive 33.

The drum 32 is preferably provided with baffles 35 arranged inside the drum 32 to control the flow of reactive gases and the passage time of the powder in the furnace 6.

Optionally, the drum 32 may be provided with lifting members 37 protruding from the inner surface of the drum 32 and designed to lift and drop the powder present in the drum 32 due to the rotation of the drum 32 about the drum central axis C, to improve the mixing of the powder and promote homogeneous contact of the powder particles with the reactive gases circulating in the drum 32. The lifting members 37 are for example in the form of lifting vanes or lifting angles distributed over the internal surface of the drum 32.

In an advantageous embodiment, the drum 32 of the furnace 6 and the transfer device 30 of the reaction chamber 18 are designed to operate independently of each other, in particular to allow the shutdown of both while maintaining the functioning of the other.

In the example illustrated, the drum 32 of the furnace 6 and the transfer device 30 of the reaction chamber 18 are designed for independent rotation of the worm of the transfer device 30, on the one hand, and of the drum 32 on the other hand, and in particular for stopping the rotation of either the worm and the drum 32 while maintaining the rotation of the other.

This disposition allows, in the shutdown phases of the conversion installation 2, to finish removing the $UO_2$ powder from the furnace 6 while the reactor 4, and in particular the transfer device 30, is already stopped.

The second water vapor injection duct and the $H_2$ injection duct feed the drum 32 through the outlet 28 for the circulation of the dry water vapor of pyrohydrolysis and the $H_2$ from the outlet 28 to the inlet 26 of the furnace 6.

The furnace 6 comprises a heater 34 for heating the drum 32. The heater 34 comprises heating elements 36 surrounding the drum 32 and distributed along the drum 32. The furnace 6 comprises a thermal chamber 38 surrounding the drum 32 and the heating elements 36.

The conversion installation 2 comprises a collection device 40 for collecting the powder at the outlet 28 of the furnace 6. The collection device 40 comprises an inlet duct 42 connected to the outlet 28 of the furnace 6 and opening into a collection container 44. The collection device 40 comprises a thermal enclosure 46 surrounding the collection container 44. The second vapor injection duct and the $H_2$ injection duct preferably open into the collection container 44.

The conversion installation 2 comprises a capture device 50 for capturing and removing the gases going back to the reactor 4, comprising the excess reactive gases, hydrogen fluoride (HF) resulting from the conversion and the neutral gas.

The capture device 50 is placed in the reactor 4, preferably in an upper region of the reaction chamber 18.

The capture device 50 comprises a plurality of filters 52 for retaining the solids that may be entrained by the gases going back into the reactor 4; in particular particles of $UO_2F_2$, or even $UO_2$.

The filters 52 are for example made of a porous material allowing the passage of excess reactive gases, neutral gas and HF resulting from the reaction of conversion of $UF_6$ to $UO_2F_2$ then to $UO_2$ while retaining a capacity of retention of $UO_2F_2$ or $UO_2$ particles. In a preferred embodiment, the filters 52 are made of ceramic or a nickel-based superalloy.

The conversion installation 2 comprises sealing devices 54 to ensure sealing between the transfer device 30 and the reaction chamber 18, between the reactor 4 and the furnace 6 and between the furnace 6 and the collection device 40. The sealing devices 54 are arranged at the junction between the transfer device 30 and the reaction chamber 18, between the outlet duct 20 of the reactor 4 and the inlet 26 of the furnace 6, and at the junction between the outlet 28 of the furnace 6 and the inlet duct 42 of the collection device 40. The sealing devices 54 ensure sealing by allowing the rotation of the transfer device 30 relative to the reactor 4 and the rotation of the drum 32 of the furnace 6 relative to the reactor 4 and to the collection device 40.

To this end, as illustrated in FIG. 1, the conversion installation 2 comprises, for example, pressurization supplies 57 arranged to supply the sealing devices 54 with an inert pressurization gas.

The sealing devices 54 are pressurized with an inert gas, and preferably with nitrogen. The pressure of the neutral gas supplying the sealing devices 54 is equal to or greater than that present in the conversion installation 2 to prevent any dispersion of powder outside the conversion installation 2.

In operation, during a production mode, the control system 16 controls the actuators 14 to connect each reagent injection duct 10 to the corresponding reagent source. Each reagent injection duct 10 is supplied with reagent. As a result, the reactor 4 and the furnace 6 are supplied with reactive gases.

The $UF_6$ and dry water vapor injected into the reactor 4 react together to form $UO_2F_2$ powder. The $UO_2F_2$ powder is introduced into furnace 6 where it reacts with the flow of dry water vapor from pyrohydrolysis and $H_2$ to convert to $UO_2$ powder.

When the control system 16 detects that a shutdown of the installation is necessary or receives an instruction to shut down the installation, the control system 16 implements a step of neutralization and purging the conversion installation 2.

To do this, the control system 16 controls the actuators 14 to connect each reagent injection duct 10 to a source of neutral gas. Each reagent injection duct 10 is thus supplied with neutral gas.

Preferably, the control system 16 is designed to control the actuators 14 to connect the reagent injection ducts 10 to a source of neutral gas sequentially from upstream to downstream of the conversion installation 2, taking into account the direction of movement of the powder from the reactor 4 to the collection container 44. This makes it possible to perform a gradual and complete purge of the reactive gases, from upstream to downstream of the conversion installation 2, more precisely in this case from reactor 4, from furnace 6 and from collection device 40 to collection container 44.

Advantageously, during the normal shutdown phase of the installation, the control system 16 is designed to successively stop the supply of $UF_6$ to reactor 4 and replace it with a supply of neutral gas, preferably via the reagent injection duct 10 supplying the reactor 4 with $UF_6$, then stop the supply of dry water vapor to reactor 4 and replace it with a supply of neutral gas, preferably via the reagent injection duct 10 supplying the reactor 4 with dry water vapor, then, after removing all the $UO_2F_2$ powder from reactor 4, stop the transfer device 30, then stop the supply of $H_2$ to furnace 6 and replace it with a supply of neutral gas, preferably via the reagent injection duct 10 supplying furnace 6 with Hz, then stop the supply of dry water vapor to furnace 6 and replace it with a supply of neutral gas, preferably via the reagent injection duct 10 supplying furnace 6 with dry water vapor, then, after all the $UO_2$ powder has been removed from furnace 6 and drum 32 has cooled, stop the rotation of drum 32.

Preferably, the control system 16 controls the actuators 14 of the neutral gas injection ducts 12 to maintain an injection of the neutral gas into the reactor 4 during the step of purging the conversion installation 2 by means of its neutral gas injection ducts 12.

Then, once the reagent injection ducts 10 have been purged of reactive gases, in a supply cut-off step, the control system 16 controls the actuators 14 to stop the supply of neutral gas to the reagent injection ducts 10 and neutral gas injection ducts 12. Preferably, the control system 16 controls the actuators 14 to cut off the supply of neutral gas to the reagent injection ducts 10 and neutral gas injection sequentially from the downstream to the upstream of the conversion installation 2 taking into account the direction of movement of the powder from the reactor 4 towards the outlet 28 of the furnace 6. This makes it possible to ensure a flushing of the furnace 6 and the reactor 4 to using neutral gas until the purge step and the supply cut-off step are complete. Alternatively, the shutdown of the neutral gas supply from downstream to upstream may be done manually.

This step is preferably carried out when the conversion installation 2 is shut down to perform a maintenance operation, in particular a maintenance operation requiring the intervention of one or more operators so as to avoid the risk of anoxia.

As a variant, the supply of neutral gas may be maintained until the restarting of the conversion installation 2. This step is implemented for example when the stopping of the conversion installation 2 is due for example to the activation of a safety measure that does not require operator intervention before restarting the conversion installation 2.

In a step of starting or restarting the conversion installation 2, the supply device 8 is designed to inject neutral gas into the reactor 4 and the furnace 6 via the reagent injection ducts 10 and the neutral gas injection ducts 12 during the heating of the conversion installation 2. When the temperature in the conversion installation is sufficient, for example 500° C. in the furnace 6, the supply device 8 is designed to start the supply of reactive gases via the reactant injection ducts 10 instead of the neutral gas sequentially, preferably from downstream to upstream of the conversion installation 2, for example according to the following sequence: dry water vapor for pyrolysis in furnace 6, then shutdown of the neutral gas supply to furnace 6 via the neutral gas injection ducts 12, then dry water vapor for hydrolysis in reactor 4, then $UF_6$ in reactor 4.

During the purge step, the power cut-off step and the starting or restarting step, the capture device 50 is active to capture the gases present in the reactor 4 and in the furnace 6.

The conversion installation 2 and the conversion method are not limited to the embodiment and the implementation described above.

In the embodiment described, each reagent injection duct 10 is supplied with neutral gas in the purging step. Alternatively, it is possible that only part of the reagent injection ducts 10 is supplied with neutral gas in the purge or start-up step.

In general, the supply device 8 is designed for supplying the $UF_6$ injection duct, the first water vapor injection duct, the second water vapor injection duct and/or the duct for injecting $H_2$ into neutral gas during a purging phase of the conversion installation 2.

In a particular embodiment, among the reagent injection ducts 10, only one among the $UF_6$ injection duct, the first water vapor injection duct, the second water vapor injection duct and the $H_2$ injection duct is supplied with neutral gas during a purge phase. This mode of implementation is used, for example, when the conversion installation 2 is partially shut down.

In a particular embodiment, only the $UF_6$ injection duct is supplied with neutral gas during a purge phase.

In the FIGURE, for the sake of clarity, several sources of neutral gas are shown for supplying the reagent injection ducts 10 and the neutral gas injection ducts 12. As a variant, a single source of neutral gas supplies the various reagent 10 or neutral gas 12 injection ducts.

Optionally, the supply device 8 may be designed for the injection of neutral gas into the collection device 40, for example near an outlet of the collection device 40 serving to supply a filling device for a transport tank with the $UO_2$ powder produced by the conversion installation 2. This makes it possible to mimic the risk of the $H_2$ coming into contact with the dioxygen ($O_2$) present in the air, which is potentially explosive.

Preferably, the conversion installation 2 is provided with at least one HF detector to detect any leakage of HF which is a gas lethal to humans.

Preferably, the actuators 14 of the power supply device 8 are resistant to seismic stresses to avoid any risk of leakage at the level of these actuators 14 in the event of an earthquake and ensure safe shutdown of the conversion installation 2.

As an option, the control system 16 of the supply device 8 may be bypassed, in particular during the start-up and shutdown or purge operations of the conversion installation 2, in particular to manually adapt the duration of the different phases in order to guarantee optimum conditions during the start-up phase and, in the shutdown phase, sufficient evacuation of reactive products and reaction products to avoid any risk of criticality.

What is claimed is:

1. A conversion installation for converting uranium hexafluoride ($UF_6$) into uranium dioxide ($UO_2$), the conversion installation comprising:
    a hydrolysis reactor configured for converting of $UF_6$ into uranium oxyfluoride powder ($UO_2F_2$) by reaction between gaseous $UF_6$ and dry water vapor injected into the hydrolysis reactor;
    a pyrohydrolysis furnace configured for converting the $UO_2F_2$ powder supplied by the hydrolysis reactor into $UO_2$ powder by reacting the $UO_2F_2$ powder with dry water vapor and dihydrogen ($H_2$) gas injected into the pyrohydrolysis furnace;
    a supply device comprising reagent injection ducts configured for injecting $UF_6$, water vapor or $H_2$, each reagent injection duct being configured to supply the hydrolysis reactor or the pyrohydrolysis furnace; and
    a control system configured to control the supply device so as to supply at least one of the reagent injection ducts with a neutral gas during a stopping or starting phase of the conversion installation,
    wherein the control system is configured to control the supply device to inject an inert gas in the pyrohydrolysis furnace during the stopping or starting phase of the conversion installation.

2. The conversion installation according to claim 1, wherein the control system is configured to control the supply device so as to supply each reagent injection duct with the inert gas during the stopping or starting phase of the conversion installation.

3. The conversion installation according to claim 1, wherein the supply device comprises, in addition to the reagent injection ducts, at least one neutral gas injection duct to inject neutral gas into the hydrolysis reactor during a production phase for converting $UF_6$ into $UO_2$ under a neutral gas atmosphere.

4. The conversion installation according to claim 1, wherein the supply device comprises a neutral gas injection duct for supplying the hydrolysis reactor with neutral gas, forming a neutral gas jet separating a $UF_6$ jet and a water vapor jet from reagent injection ducts opening into the hydrolysis reactor.

5. The conversion installation according to claim 1, wherein the control system is configured to supply each of the reagent injection ducts with a neutral gas, by supplying the reagent injection ducts sequentially from upstream to downstream or from downstream to upstream of the conversion installation, taking into account a direction of movement of the uranium in the conversion installation.

6. The conversion installation according to claim 1, wherein the control system is configured to, in the stopping phase of the conversion installation, successively:
   stop the supply of $UF_6$ to the hydrolysis reactor and replace the supply of $UF_6$ with a supply of neutral gas; then
   stop the supply of dry water vapor to the hydrolysis reactor and replace dry water vapor with a supply of neutral gas; then
   optionally, after removing all the $UO_2F_2$ powder from the hydrolysis reactor, stop a transfer device configured to transfer the $UO_2F_2$ powder from the hydrolysis reactor to the pyrohydrolysis furnace; then
   stop the supply of $H_2$ to the pyrohydrolysis furnace and replace the supply of $H_2$ with a supply of neutral gas; then
   stop the supply of dry water vapor to the pyrohydrolysis furnace and replace the supply of dry water vapor with a supply of neutral gas; then
   optionally, after removing all the $UO_2$ powder from the pyrohydrolysis furnace and cooling a drum of the pyrohydrolysis furnace, stop the drum from rotating.

7. The conversion installation according to claim 1, wherein the supply device comprises neutral gas injection ducts for supplying the hydrolysis reactor with neutral gas,
   wherein the control system is configured to, during the starting phase of the conversion installation, successively:
   inject neutral gas into the hydrolysis reactor and the pyrohydrolysis furnace via the reagent injection ducts and the neutral gas injection ducts during a heating step of the conversion installation; then
   replace the neutral gas supply via the reagent injection ducts of the pyrohydrolysis furnace and the hydrolysis reactor with a reactive gas supply, by supplying the reagent injection ducts with reactive gases sequentially from downstream to upstream of the conversion installation, taking into account a direction of uranium movement in the conversion installation.

8. A method for converting uranium hexafluoride ($UF_6$) into uranium dioxide ($UO_2$) in the conversion installation recited in claim 1, the method comprising the steps of:
   converting $UF_6$ into $UO_2$ by supplying the hydrolysis reactor and the pyrohydrolysis furnace with reactive gases via reagent injection ducts during a conversion phase, each reagent injection duct opening into the hydrolysis reactor or into the pyrohydrolysis furnace; and
   supplying at least one of the reagent injection ducts with a neutral gas during the stopping or starting phase of the conversion installation.

9. The conversion method according to claim 8, wherein during the stopping or starting phase of the conversion installation, each reagent injection duct is supplied with neutral gas.

10. The conversion method according to claim 8, wherein during a production phase, the neutral gas is injected into the hydrolysis reactor via at least one neutral gas injection duct to achieve conversion under a neutral gas atmosphere.

11. The conversion method according to claim 8, wherein the stopping phase of the conversion installation comprises a purging step during which the reagent injection ducts are supplied with neutral gas sequentially from upstream to downstream of the conversion installation, taking into account a direction of uranium movement.

12. The conversion method according to claim 8, further comprising, in the stopping phase of the conversion installation, the successive steps of:
   stopping the supply of $UF_6$ to the hydrolysis reactor and replace the supply of $UF_6$ with a supply of neutral gas; then
   stopping the supply of dry water vapor to the hydrolysis reactor and replace the supply of dry water vapor with a supply of neutral gas; then
   optionally, after removing all the $UO_2F_2$ powder from the hydrolysis reactor, stopping a transfer device configured to transfer the $UO_2F_2$ powder from the hydrolysis reactor to the pyrohydrolysis furnace; then
   stopping the supply of $H_2$ to the pyrohydrolysis furnace and replacing the supply of $H_2$ with a supply of neutral gas; then
   stopping the supply of dry water vapor to the pyrohydrolysis furnace and replace the supply of dry water vapor with a supply of neutral gas; then
   optionally, after removing all the $UO_2$ powder from the pyrohydrolysis furnace and cooling a drum of the pyrohydrolysis furnace, stopping the drum from rotating.

13. The conversion method according to claim 8, comprising, in a start-up phase of the conversion installation, the successive steps of:
   injecting neutral gas into the hydrolysis reactor and the pyrohydrolysis furnace via the reagent injection ducts and neutral gas injection ducts during a heating step of the conversion installation; then
   replacing the neutral gas supply via the reagent injection ducts of the pyrohydrolysis furnace and the hydrolysis reactor with a reactive gas supply, by supplying the reagent injection ducts with reactive gases sequentially from downstream to upstream of the conversion installation taking into account a direction of uranium movement.

* * * * *